United States Patent [19]

Mallett

[11] 4,450,540
[45] May 22, 1984

[54] SWEPT ENERGY SOURCE ACOUSTIC LOGGING SYSTEM

[75] Inventor: A. J. Mallett, Houston, Tex.

[73] Assignee: Halliburton Company, Duncan, Okla.

[21] Appl. No.: 410,165

[22] Filed: Aug. 20, 1982

Related U.S. Application Data

[63] Continuation of Ser. No. 129,952, Mar. 13, 1980, abandoned.

[51] Int. Cl.³ ............................ G01V 1/40; G01V 1/28
[52] U.S. Cl. ........................................ 367/41; 367/31; 367/32; 181/102
[58] Field of Search ...................... 367/31, 321, 41, 49, 367/75, 86; 181/102, 103, 106; 364/422

[56] References Cited

U.S. PATENT DOCUMENTS

| | | | |
|---|---|---|---|
| 3,311,875 | 3/1967 | Geyer et al. | 367/41 |
| 3,962,674 | 6/1976 | Howell | 367/41 |
| 4,328,567 | 5/1982 | Dodge | 367/75 |

OTHER PUBLICATIONS

Pichett, "Acoustic Character Logs . . . Evaluation", 10/10/62, pp. 659–667, J. Petr. Tech.
Arar, "Formation Congressional . . . Techniques", 10/3/78, 53rd Ann. Fall Tech. Conf. AIME, pp. 1–11.

Primary Examiner—Nelson Moskowitz
Attorney, Agent, or Firm—W. J. Beard

[57] ABSTRACT

An acoustic energy mode propagation speed or travel time measurement system for use in well logging is disclosed. A downhole sonde is provided with an acoustic transmitter and at least one acoustic receiver. The transmitter is repetitively driven with a unique or characteristic swept frequency signal. Propagated acoustic energy detected at the receiver is cross-correlated with the characteristic transmitter swept frequency signal to provide indications of the arrival of various modes of acoustic energy propagation at the receiver. Logs as a function of borehole depth of the speed of propagation of the various modes of propagation may be derived.

3 Claims, 5 Drawing Figures

SWEPT ENERGY SOURCE ACOUSTIC LOGGING SYSTEM

This application is a continuation of application Ser. No. 129,952 filed Mar. 13, 1980, and now abandoned.

BACKGROUND OF THE INVENTION

This invention relates to methods and systems for measuring acoustic wave travel times in earth formations in the vicinity of the well borehole. More particularly, the present invention relates to techniques for measuring multiple acoustic wave component (or wave propagation mode) travel times in earth formations in the vicinity of a well borehole. The measurement methods use swept frequency transmitting techniques and cross correlation comparison techniques between the transmitted signal and received signal.

Sonic or acoustic well logging has become an important method for determining the physical characteristics of earth formations in the vicinity of a well borehole. Measurement of the acoustic compressional wave velocity or travel time between a transmitter and a receiver in a well borehole can define physical characteristics of the earth formations which are indicative of the capability of these formations to produce oil or gas. For example, a measurement of the compressional wave travel time or velocity gives a direct indication of the porosity of the formation in the vicinity of the well borehole. Such acoustic velocity or acoustic travel time measurements have therefore become practically standard for all new wells which are drilled.

In the prior art, acoustic pulse or pulsed sonic logging techniques have been used to measure the travel time or velocity of acoustic waves in the earth formations in the vicinity of a borehole. Such methods of the prior art have typically used impulse driven acoustic transmitters. An acoustic transmitter is fired impulsively or pulsed and the length of time necessary for the acoustic wave pulse generated by the transmitter to propagate from the transmitter through the earth formations in the vicinity of the borehole and back to an acoustic receiver located a spaced distance away from the transmitter is measured. By appropriately combining the measurements of acoustic wave travel time at several acoustic receivers, spaced different distances from either a single (or multiple) acoustic transmitter, then the acoustic wave travel time or sonic compressional wave velocity of propagation of the earth formation may be determined. Quite elaborate schemes and geometrical considerations for eliminating the effect on the travel time measurement of the borehole and borehole fluids have also been developed.

In more recent years, it has become desired to measure other acoustic wave mode travel times than merely compressional wave velocity. For example, in U.S. Pat. No. 4,131,875 issued Dec. 26, 1978, techniques are described for measuring the so called "late arrival" waves or Stonely waves. Similarly, other prior art techniques such as that shown in U.S. Pat. No. 3,354,983 issued Nov. 28, 1967, describes techniques for measuring acoustic shear wave velocities. In all of these techniques, an acoustic pulse is generated by the transmitter and the waveform of the acoustic signal at one or more receivers is analyzed in order to determine the velocity of compressional, shear, or Stonely waves in the vicinity of the borehole.

Pulsed acoustic techniques depend upon the amplitude detection of the arrival of acoustic waves at a receiver. Such techniques are prone to errors generated by random noise which occurs as a well logging instrument is moved through the borehole. Acoustic noise maybe generated by the instrument body, or centralizers on the instrument body, scraping along the sides of the borehole as the tool is moved therethrough.

Similarly, pulsed acoustic techniques involving pulsed acoustic transmitters for measuring shear waves or Stonely waves depend upon an elaborate interpretation of the waveform of the arriving wave at the receiver. Such interpretations are generally based on theoretical calculations made with simplified mathematical models of the earth formations in the vicinity of the borehole. If the simplified mathematical model proves to be in error, then the interpretation of the arriving waveform at the receiver may be in error and its relationship to more complicated real life geometries and conditions than taken into account in the model can lead to false interpretations of the waveform of the arriving acoustic signal.

It would be highly desirable to provide a method for measuring the travel time of various components of acoustic energy (compressional or primary wave, shear wave, Rayleigh or pseudo Rayleigh, direct (fluid) wave, extentional, and Stonely wave) in earth formations in the vicinity of a well borehole which was not dependent upon a theoretical interpretation of an arriving acoustic pulse waveform in terms of a model. The system of the present invention provides a direct measurement of the travel time of several components of acoustic energy from a transmitter to a receiver in earth formations in the vicinity of a well borehole.

BRIEF DESCRIPTION OF THE INVENTION

In the present invention, a downhole well logging instrument is provided with an acoustic transmitter and at least one acoustic receiver that is spaced a longitudinal distance from the transmitter. If desired, multiple transmitters and receivers could be used. The output signal from the acoustic transmitter in the present invention is repetitively swept over a predetermined frequency range. The frequency swept output of the transmitter is propagated in all the various modes of propagation of acoustic energy through the earth formations and borehole and is detected at the spaced receiver. A synchronization signal is also generated at the commencement of each repetitive sweep of the transmitter through its predetermined frequency range. The synchronization signal and the received signal from the receiver are transmitted to the surface of the earth via conductors of the well logging cable. At the surface, the received signal is converted from analog to digital form and stored in a memory. The transmitter sweep signal is stored in a surface located sweep signal memory storage in digital form. Upon completion of a sweep of the transmitter and after receiving digitizing and storing the received signal for a predetermined length of time the sweep signal from the transmitter is cross-correlated with the received signal. Because of the characteristic swept frequency pattern applied to the transmitter signal, indications are derived from the cross-correlation of the arrivals of various modes of acoustic energy propagation at the receiver. The timing differences between the synchronization pulse and the arrival of the various modes of acoustic propagation at the receiver may then be interpreted in terms of the travel time of the various modes of acoustic propagation at the receiver. These signals may then be recorded as a function of borehole depth as the well logging instrument is moved through the borehole. The entire sweep, transmit, and receive process is repetitively performed during such movement of the borehole instrument.

The invention may be best understood by the following detailed description thereof, when taken in conjunction with the appended drawings in which:

DESCRIPTION OF THE PREFERRED EMBODIMENT

Figure 1:
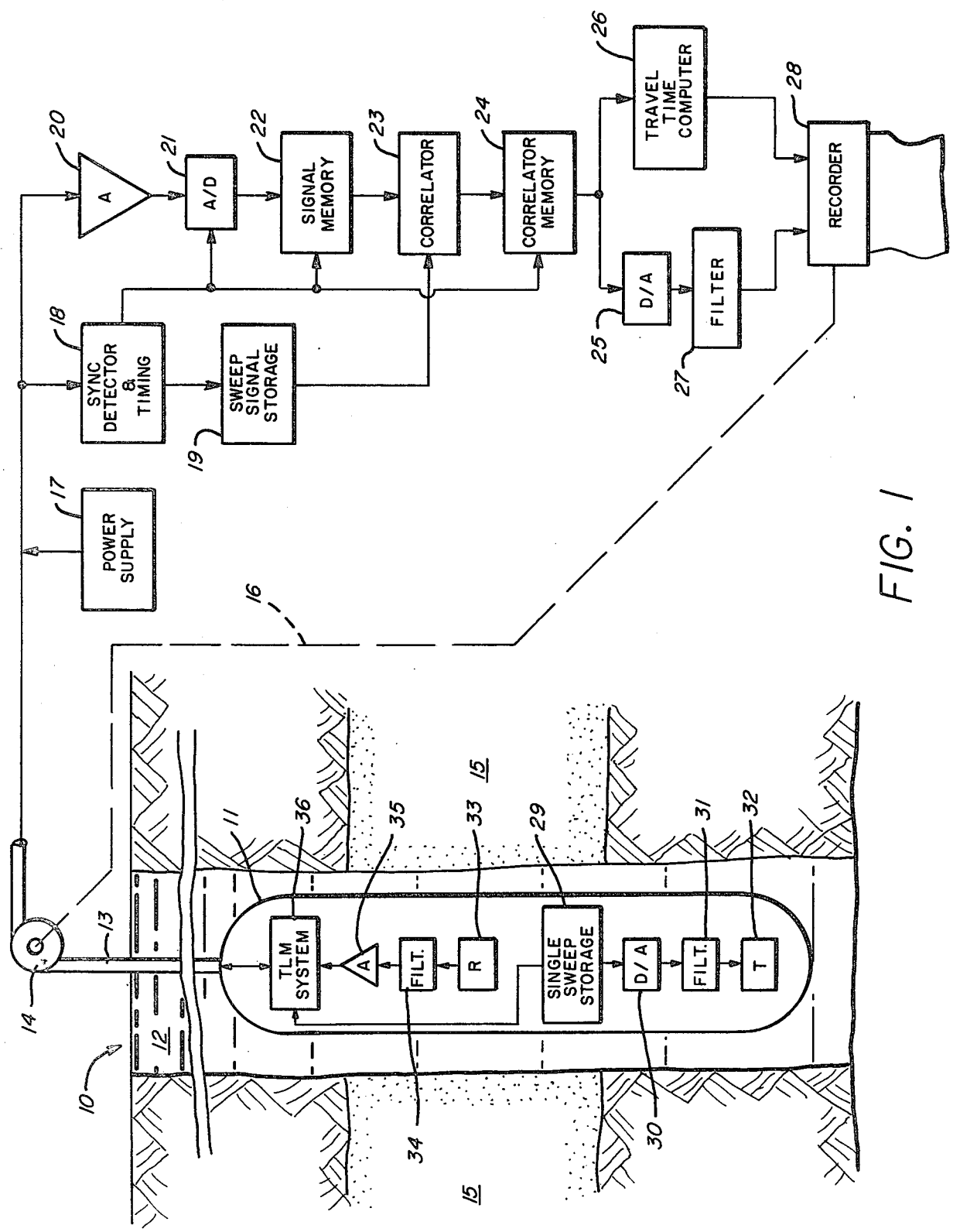
FIG. 1 is an overall block diagram illustrating schematically a well logging system in accordance with the concepts of the present invention.

Referring initially to Fig. 1, a system for generating and receiving acoustic signals and for logging a well borehole in accordance with the concepts of the present invention is illustrated schematically. A well borehole 10 penetrates earth formations 15 and is filled with a borehole fluid 12. A downhole well logging sonde 11 is suspended, via a well logging cable 13, which passes over a sheave wheel 14, in the borehole 10. The sheave wheel 14 is electrically or mechanically coupled to a well logging recorder 28 of conventional design as illustrated by dotted line 16 so that measurements made by the down hole sonde 11 may be recorded as a function of borehole depth.

The downhole sonde 11 comprises a fluid tight, hollow, body member sized and adapted for passage through a well borehole. Housed inside the fluid tight sonde 11 is an acoustic transmitter 32 and an acoustic receiver 33. Circuitry for driving the acoustic transmitter 32 comprises a sweep signal storage memory 29, which may comprise a read only memory (ROM) or the like, a digital to analog converter 30, and a filter 31.

The acoustic receiving transducer 33 is shown longitudinally spaced from the transmitting transducer 32. Typical spacing distances of from 3 to 10 feet may be used as desired. It will be appreciated that acoustic transmitting transducer 32 and acoustic receiving transducer 33 are acoustically coupled to the borehole by acoustic impedance matching material such as oil or oil-filled bellows or the like (not shown) in a manner known in the art. The transmitting and receiving transducers may comprise piezoelectric transducers. The transmitting and receiving transducers are sized and arranged to have a linear or "flat" response over the swept frequency range used in the technique of the present invention.

While only one acoustic transmitter and one acoustic receiver are illustrated in the system of FIG. 1, it will be appreciated by those skilled in the art that the number of acoustic receivers could be varied and the number of acoustic transmitters could be varied, if desired. In such an instance different sweep patterns could be used for each acoustic transmitter to characterize its output acoustic energy from that of any other acoustic transmitter which is utilized in the logging instrument.

The sweep signal storage memory 29 contains digital numbers representative of the amplitude of sweep pattern to be applied to the transmitting transducer 32 as a function of time at a preselected sampling interval time or rate. For example, a typical sweep frequency pattern could be that given by Equation 1.

$$f(t)\bigg|_{t=T_1}^{t=T_2} = \sin\left[\omega_1 + \frac{(\omega_2 - \omega_1)}{2L} t\right] t \tag{1}$$

In Equation 1 a sine wave whose frequency changes in a linear fashion from $\omega_1$ at $T_1$ to $\omega_2$ at $T_2$ is described. Such sweep function amplitudes can be generated by computer as a function of time and the results then stored in a read only memory or ROM device for subsequent use in the subsurface tool and surface equipment as desired.

Digital signals from the sweep signal storage ROM 29 are read out sequentially and converted to analog signals by a digital to analog converter 30. The output of the digital to analog converter 30 is filtered by low pass filter 31 to remove the small sample to sample step introduced by the digital to analog converter (i.e. to remove high frequency components) and the output voltage signals from the filter 31 drive the transmitter transducer.

Figure 3:
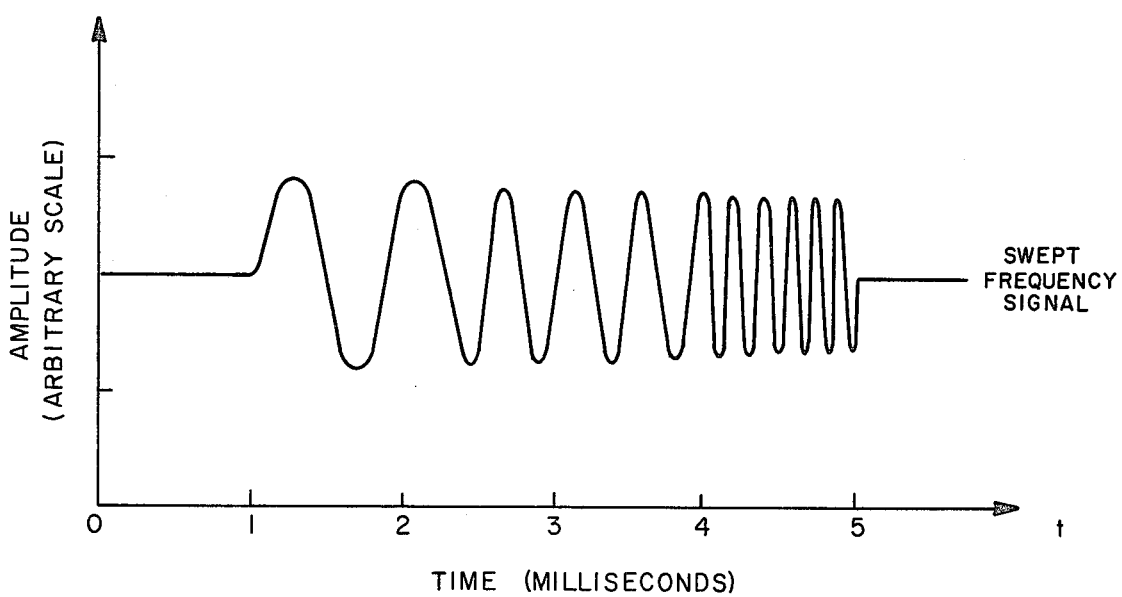
FIG. 3 is a graphical representation illustrating a typical swept frequency waveform applied to the acoustic transmitting transducer in the present invention.

A typical sweep pattern such as that described by Equation 1 is illustrated in FIG. 3. A synchronization pulse is generated at the beginning of a sweep cycle and is labelled as "sync pulse" in FIG. 4. A swept frequency acoustic signal having a linearly increasing frequency and starting at a time approximately 0.1 millisecond after the synchronization pulse is illustrated. The frequency of the transmitter drive signal increases until a time approximately 5 milliseconds following the sync pulse, thus generating a swept frequency acoustic signal having approximately constant amplitude and linearly varying frequency of from, for example, 2 to 12 kilohertz and having a duration of approximately 4 milliseconds. It will be appreciated that other durations or other swept frequency ranges could be used if desired.

The acoustic signals detected by receiving transducer 33 are filtered by a band pass filter 34 to remove any noise signals which are far removed from the pass band of the original swept frequency signal. After filtering, the signals are amplified by an amplifier 35 and applied to a telemetry system 36 which transmits the received acoustic signal waveform to the surface via conductors of well logging cable 13.

Figure 4:
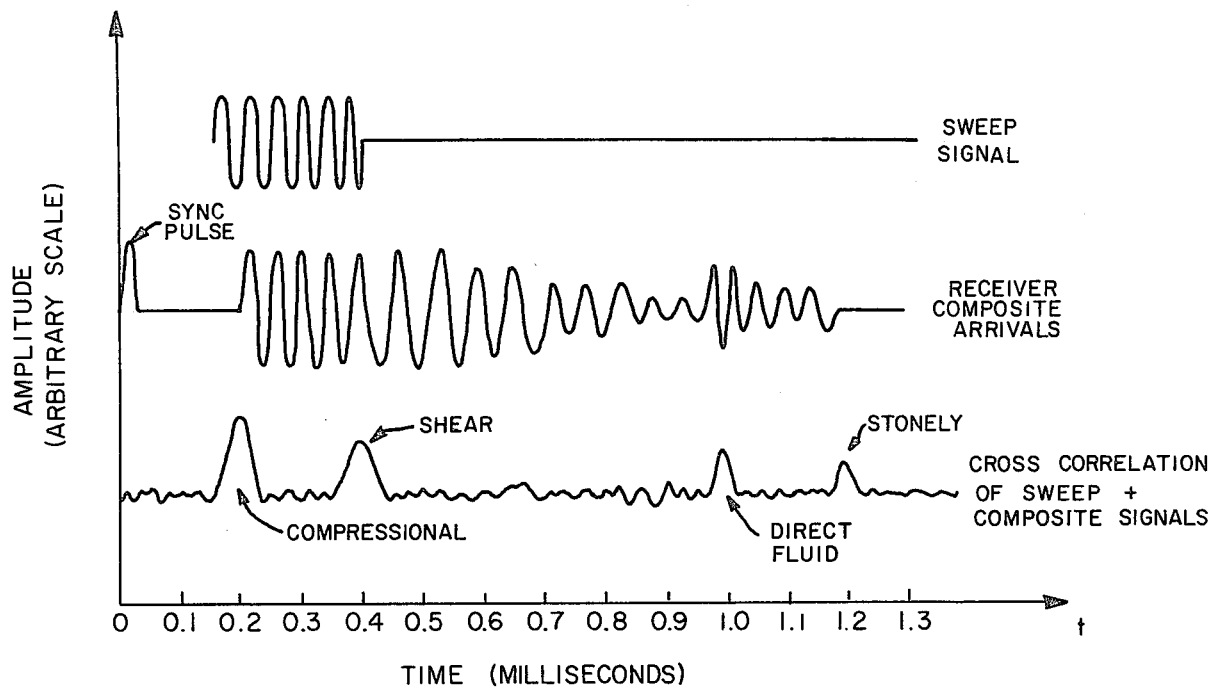
FIG. 4 is a graphical representation illustrating a swept frequency signal applied to an acoustic transmitter in accordance with the concepts of the invention, a composite or mixed mode arrival signal which arrives at the acoustic receiver of the present invention, and the output of a cross-correlation between the sweep and the composite arrival signal in accordance with the present invention.

Timing for the transmitter sweep event and the synchronization pulse is controlled by the telemetry system 36 which contains a precise frequency clock such as crystal controlled oscillator therein. The synchronization signal illustrated in FIG. 3 is transmitted to the surface so that the surface electronics may be exactly synchronized for each time of starting of the transmitter sweep cycle. For a 4 millisecond sweep rate and an approximately 10 millisecond receiver recording time, such as that illustrated in FIG. 4, the entire cycle of transmitter sweep and receiver reception transmission to the surface may be repeated at a repetition rate of from 10 to 20 cycles per second. It will be appreciated by those skilled in the art that the duration of reception by the receiver and the transmission of received signals is a function of the spacing between the transmitter and receiver. For typical spacings on the order of four to six feet, the 10 millisecond receive signal transmission cycle illustrated in FIG. 4 is appropriate.

At the surface, a synchronization detector and timing circuit 18 detects the synchronization signal and generates outputs to an analog to digital converter 21, a signal memory 22, a correlator memory 24 and a sweep signal memory storage 19. The receiver signal from the downhole telemetry system is amplified in an amplifier 20 and converted to digital format by analog to digital converter 21, which is timed by the signal from the sync detector and timing circuit 18. The digitized form of the received signal is then stored in a signal memory 22. At an appropriate time which allows for the complete receiver signal waveform to be digitized and stored in signal memory 22, the synchronization detector in timing circuit 18 supplies a strobe or output signal pulse to the sweep signal storage memory 19 and to the signal memory 22 which cause these two signals to be supplied as input in digital form to a correlator 23.

The correlator 23 performs a cross correlation function on the two input signals which is defined by Equation 2.

$$\Phi xy(\tau) = \sum_{K=-N}^{K=N} (X_k)(Y_k + \tau) \quad (2)$$

In Equation 2, $X_k$ and $Y_k$ are discreet functions of time. Hence the cross-correlation function $\Phi xy$ is also a discreet function of time. If $X_k$ and $Y_k$ each contain N points and the shift amount $\tau$ is equal to the sampling interval of $X_k$ and $Y_k$ then the total number of points produced by the cross-correlator 23 will be $2N-1$. The number of products formed by the cross-correlations for an example of N points is $N^2$.

Figure 5:
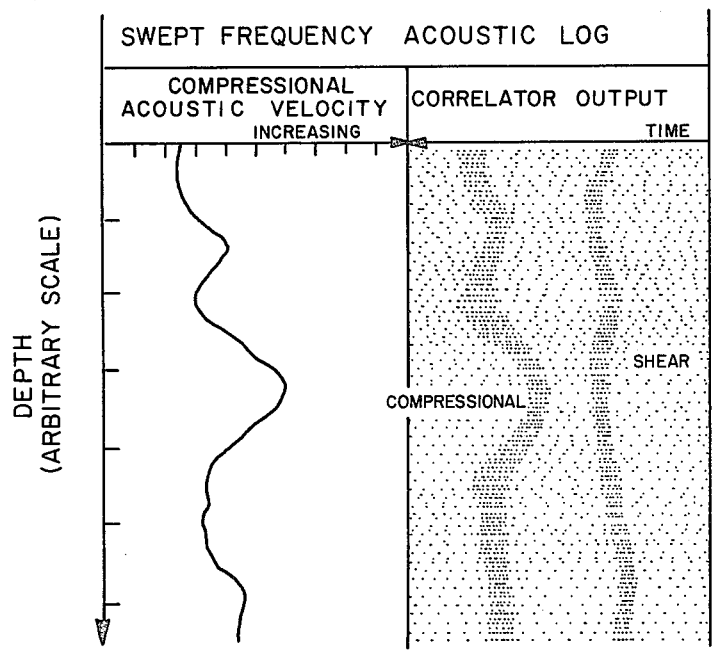
FIG. 5 is an illustration schematically showing a well log as a function of depth of the acoustic compressional wave velocity and the correlator output showing compressional and shear wave arrivals in accordance with the concepts of the present invention.

The digital output of the correlator 23 is supplied to a correlator memory 24 which is also supplied with timing pulses from the synchronization detector and timing circuit 18 as previously described. The digital output from the correlator memory, upon receipt of an appropriate timing pulse from circuit 18, is supplied to a digital to analog converter 25 where it is reconverted to analog form for display as illustrated in FIG. 5. The output from the digital to analog correlator 25 is then filtered via bandpass filter 27 and supplied to the recorder 28 for recording as a variable density display as illustrated in the right-hand half of the well log as a function of depth illustrated in FIG. 5.

The output from the correlator memory 24 is also supplied to a travel time computer 26 which computes the travel time from the transmitter to the receiver for selected arrivals at the receiver such as the compressional wave travel time and the shear wave travel time. The compressional wave travel time or shear wave travel time is then supplied to the recorder 28 for recording as a function of depth as illustrated in the left-hand half of the well log of FIG. 5.

Referring now to FIG. 4 the sweep signal, the composite receiver signal and the cross-correlation of the sweep signal and composite receiver signals are illustrated as a function of time. It will be noted that the cross-correlation output formed illustrates peaks which may be interpreted in terms of the compressional wave arrival, the shear wave arrival, the direct wave arrival, and the Stonely wave arrival. Travel times for these various acoustic modes may thus be computed by the travel time computer 26 by comparing these arrivals with the sync pulse and deriving the time difference from it to these arrivals.

It will be appreciated by those skilled in the art that power for the operation of the downhole electronics as well as the surface electronics may be supplied from a surface located supply 17 via conductors of the well logging cable 13. Appropriate downhole power converters (not shown) may be housed in the downhole sonde 11 in order to provide operational voltages for the downhole electronic systems in a manner well known in the art.

Figure 2:
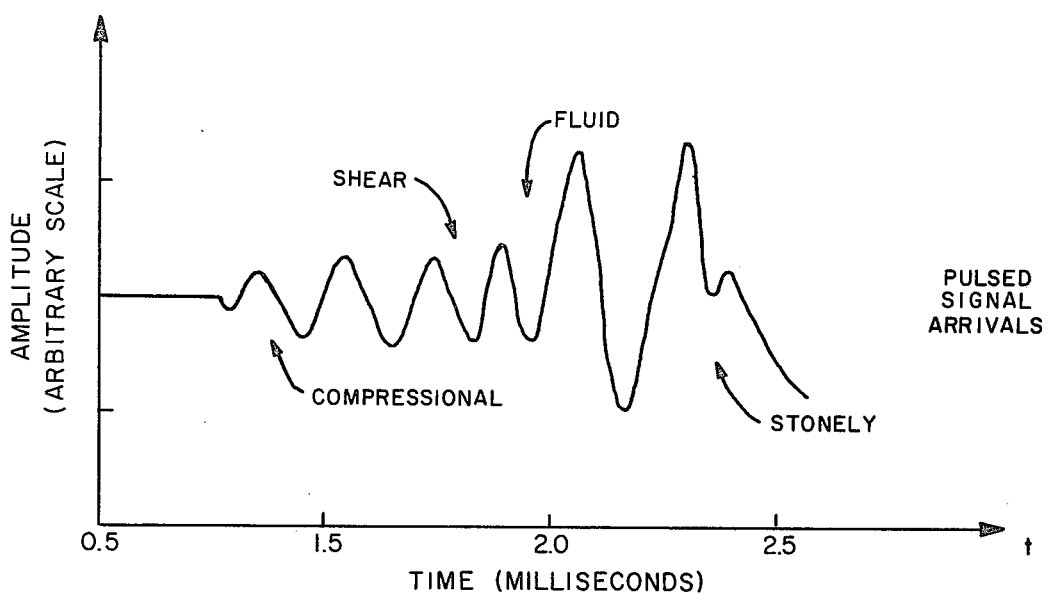
FIG. 2 is a schematic diagram illustrating an acoustic waveform received at a spaced receiver from a pulsed acoustic transmitter as utilized in the prior art.

Referring now to FIG. 2, an acoustic waveform from a pulsed transducer such as that used in the prior art is illustrated. The typical acoustic waveform may be interpreted according to propagation velocities of various modes of acoustic energy propagation in the borehole. Thus the initial arrival is generally interpreted as that from the compressional wave which is usually propagated faster through the earth formations in the vicinity of a well borehole. Appearing later on in arriving waveform are energy peaks which may be interpreted as the shear wave, the fluid wave and the Stonely wave portions of the acoustic wave form. Depending upon the transmitter to receiver spacing and the amount of reflection occurring within the borehole, interference between the different modes of propagation can occur in prior art pulsed acoustic travel time measurements for the different modes of acoustic propagation. The present invention by utilizing a unique or characteristic variable frequency swept signal and correlation of this signal with the entire acoustic wave train arriving at the receiving transducer can produce more readily identifiable output pulses on the cross-correlator output as illustrated in FIG. 4 to separate the various arrivals of acoustic mode propagation in a manner superior to that known in the prior art. Thus improved acoustic travel time measurements of compressional, shear, Stonely and other modes of acoustic propagation are provided by the present invention which were subject to ambigious interpretation in the prior art.

It will be recognized by those skilled in the art that the acoustic transmitting transducer and acoustic receiving transducer of the present invention may be mounted on pad arms (not shown) and urged against the wall of the borehole if desired, rather than being housed in the body of the sonde as illustrated in FIG. 1. Similarly, a back-up arm (not shown) could be used if desired, to urge the body of the sonde of FIG. 1 against one wall of the borehole. Because of the statistical nature of the cross-correlation in detecting the arriving signals at the receiving transducers in the present invention so called "road noise" or noise generated by the motion of the logging tool through the borehole is minimized.

Other changes and modifications which fall within the true spirit and scope of the present invention may be suggested by the foregoing descriptions to those skilled in the art. Accordingly, it is the aim of the appended claims to cover all such changes and modifications as may be made apparent to those skilled in the art.

I claim:

1. A well logging system for measuring and recording the acoustic energy propagation characteristic of earth formations penetrated by a well borehole comprising:

a fluid tight hollow body member sized and adapted for passage through a well borehole;

means in said body member for repetitively generating swept frequency acoustic energy outputs having a linearly varying range of frequencies from a lowest frequency of approximately two kilohertz to a highest frequency of approximately twelve kilohertz in a characteristic pattern, said pattern having a duration of approximately four milliseconds;

means for digitizing said characteristic swept frequency signal and for providing a digital signal representative of said characteristic signal at said generating means;

receiver means longitudinally spaced from said generating means by a distance of from eight to twelve feet in said body member, for detecting acoustic energy propagated from said generating means through the borehole and earth formations in the vicinity of the borehole and for generating digital signals representative of said detected acoustic energy;

means for cross correlating said digital signal representative of said characteristic signal at said generating means and said digital signal representative of said detected acoustic energy and for providing a correlator output signal representative of the arrival at said receiver means of different modes of propagation of acoustic energy in the borehole and earth formations in the vicinity of the borehole;

computer means responsive to said correlator output signal for deriving therefrom measurements of the speed of propagation of said different modes of propagation of acoustic energy in the earth formations in the vicinity of the well borehole;

means for recording said measurements of the speed of propagation of said different modes of acoustic energy as a function of borehole depth, thereby providing on a record medium a well log of speed of propagation of different modes of acoustic energy; and means for recording as a function of borehole depth said correlator output signal, thereby providing a well log indicative of the time of arrival at said receiver means of different modes of propagation of acoustic energy.

2. The system of claim 1 wherein said correlator output signals are recorded as a function of borehole depth in a variable density display pattern.

3. The well logging system of claim 1 wherein separate well logs are recorded as a function of borehole depth for compressional wave propagation speed, shear wave propagation speed and Stoneley wave propagation speed, and wherein said logs are recorded on the same depth scale with said variable density display of said correlator output signals.

* * * * *